US011036500B2

(12) United States Patent
Engh-Halstvedt

(10) Patent No.: US 11,036,500 B2
(45) Date of Patent: Jun. 15, 2021

(54) TECHNIQUE FOR PROCESSING A SEQUENCE OF ATOMIC ADD WITH CARRY INSTRUCTIONS WHEN A DATA VALUE IS NOT PRESENT IN A CACHE

(71) Applicant: Arm Limited, Cambridge (GB)

(72) Inventor: Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/661,196

(22) Filed: Oct. 23, 2019

(65) Prior Publication Data

US 2020/0057636 A1 Feb. 20, 2020

Related U.S. Application Data

(62) Division of application No. 15/528,924, filed as application No. PCT/GB2015/053300 on Nov. 3, 2015, now abandoned.

(30) Foreign Application Priority Data

Dec. 19, 2014 (GB) .................................. 1422785.4

(51) Int. Cl.
*G06F 9/30* (2018.01)
*G06F 9/38* (2018.01)
(Continued)

(52) U.S. Cl.
CPC .......... *G06F 9/3001* (2013.01); *G06F 9/3004* (2013.01); *G06F 9/3009* (2013.01);
(Continued)

(58) Field of Classification Search
CPC .. G06F 9/3001; G06F 12/0875; G06F 9/3016; G06F 9/3009; G06F 9/30014;
(Continued)

(56) References Cited

U.S. PATENT DOCUMENTS 5,542,084 A 7/1996 Lowe, Jr.
5,838,960 A 11/1998 Harriman, Jr.
(Continued)

FOREIGN PATENT DOCUMENTS

CN 103092571 5/2013
EP 1 308 835 5/2003

OTHER PUBLICATIONS

U.S. Appl. No. 15/528,924, filed May 23, 2017, Engh-Halstvedt.
(Continued)

*Primary Examiner* — Shawn Doman
(74) *Attorney, Agent, or Firm* — Nixon & Vanderhye P.C.

(57) ABSTRACT

Processing circuitry performs processing operations specified by program instructions. An instruction decoder decodes an atomic-add-with-carry instruction AADDC to control the processing circuitry to perform an atomic operation of an add of an addend operand value and a data value stored in a memory to generate a result value stored in the memory and a carry value indicative of whether or not the add generated a carry out. The atomic-add-with-carry instructions may be used within systems which accumulate a local sum value prior to a data value being returned into a local cache memory at which time the local sum value is added to the return data value. The atomic-add-with-carry instructions may also be used in embodiments comprising a coalescing tree of respective processing apparatus where the carry out values generated from local sums produced at each node are returned early to higher nodes within the hierarchy thereby releasing them to commence other processing.

18 Claims, 13 Drawing Sheets

(51) Int. Cl.
*G06F 12/0875* (2016.01)
*G06F 7/50* (2006.01)

(52) U.S. Cl.
CPC ........ *G06F 9/30014* (2013.01); *G06F 9/3016* (2013.01); *G06F 9/30094* (2013.01); *G06F 9/3851* (2013.01); *G06F 9/3887* (2013.01); *G06F 12/0875* (2013.01); *G06F 2212/452* (2013.01)

(58) Field of Classification Search
CPC .. G06F 9/3887; G06F 9/3851; G06F 9/30094; G06F 9/3004; G06F 2212/452
USPC .................................................. 712/208, 221
See application file for complete search history.

(56) References Cited

U.S. PATENT DOCUMENTS

| | | | |
|---|---|---|---|
| 5,968,165 A | 10/1999 | Hansen | |
| 6,367,003 B1* | 4/2002 | Davis | G06F 9/3001 712/208 |
| 6,470,374 B1 | 10/2002 | Jin et al. | |
| 6,973,551 B1 | 12/2005 | Walton | |
| 7,600,221 B1* | 10/2009 | Rangachari | G06F 9/3808 712/215 |
| 7,627,723 B1 | 12/2009 | Buck et al. | |
| 8,112,691 B1* | 2/2012 | Spracklen | H03M 13/096 714/758 |
| 2003/0028750 A1 | 2/2003 | Hogenauer | |
| 2007/0294666 A1* | 12/2007 | Papakipos | G06F 11/3644 717/119 |
| 2011/0078225 A1 | 3/2011 | Johnson et al. | |
| 2013/0212358 A1* | 8/2013 | Tran | G06F 9/3851 712/208 |
| 2015/0039862 A1* | 2/2015 | Barowski | G06F 9/3826 712/218 |
| 2017/0083236 A1* | 3/2017 | Chen | G06F 12/06 |

OTHER PUBLICATIONS

Office Action dated Mar. 22, 2019 in U.S. Appl. No. 15/528,924 (14 pages).
International Search Report and Written Opinion of the ISA for PCT/GB2015/053300, dated May 11, 2016, 19 pages.
Search Report for GB 1422785.4, dated Jun. 15, 2015, 6 pages.
Intel 64 and IA-32 Architectures Software Developer's Manual vol. 2A: Instruction Set Reference, A-M (excerpted pages), Datasheet [online], Intel Corporation, Dec. 2009 [retrieved on Mar. 4, 2019], retrieved from https://www.naic.edu/~phil/software/intel/253666. pdf. 6 pages.
First Office Action for CN Application No. 201580067802.7 dated Jun. 1, 2020 and English translation, 22 pages.

* cited by examiner

TECHNIQUE FOR PROCESSING A SEQUENCE OF ATOMIC ADD WITH CARRY INSTRUCTIONS WHEN A DATA VALUE IS NOT PRESENT IN A CACHE

This application is a divisional of U.S. application Ser. No. 15/528,924, filed May 23, 2017, which is the U.S. national phase of International Application No. PCT/GB2015/053300 filed Nov. 3, 2015 which designated the U.S. and claims priority to GB Patent Application No. 1422785.4 filed Dec. 19, 2014, the entire contents of each of which are hereby incorporated by reference.

This disclosure relates to the field of data processing systems.

Some data processing systems may support atomic instructions which access data values in memory and are executed such that the results of executing the instruction are consistent with the instruction having exclusive access to the data value in memory during execution of the instruction, e.g. no other instruction can access the same data value in an overlapping fashion so as to produce a result inconsistent with the atomic instruction having had exclusive access to that data value during its execution. Atomic instructions are used in an effort to isolate the execution of individual instructions so that there is no inappropriate and/or undesired interaction with the execution of other instructions.

At least some embodiments of the disclosure provide apparatus for processing data comprising:

processing circuitry to perform processing operations specified by program instructions; and an instruction decoder to decode an atomic-add-with-carry instruction to control said processing circuitry to perform as an atomic operation an add of an addend operand value and a data value stored in a storage unit in a manner consistent with exclusive access to said data value during said atomic operation to generate a result value stored in said storage unit and a carry value indicative of whether said add generated a carry out.

At least some further embodiments of the disclosure provide apparatus for processing data comprising:

processing means for performing processing operations specified by program instructions; and instruction decoding means for decoding an atomic-add-with-carry instruction to control said processing means to perform as an atomic operation an add of an addend operand value and a data value stored in a storage unit in a manner consistent with exclusive access to said data value during said atomic operation to generate a result value stored in said storage unit and a carry value indicative of whether said add generated a carry out.

At least some further embodiments of the disclosure provide a method of processing data comprising:

performing processing operations specified by program instructions with processing circuitry; and decoding an atomic-add-with-carry instruction to control said processing circuitry to perform as an atomic operation an add of an addend operand value and a data value stored in a storage unit in a manner consistent with exclusive access to said data value during said atomic operation to generate a result value stored in said storage unit and a carry value indicative of whether said add generated a carry out.

Example embodiments will now be described, by way of example only, with reference to the accompanying drawings in which:

FIG. 1 schematically illustrates a data processing system for executing atomic instructions;

FIG. 2 schematically illustrates a multi-processor data processing system having a shared memory;

FIG. 3 schematically illustrates the action of two threads each executing a sequence of atomic-add-with-carry instructions accumulating respective different bit significance portions of an accumulated value;

FIG. 4 schematically illustrates the relative ordering of execution of the atomic-add-with-carry instructions illustrated in FIG. 3;

FIGS. 5A to 5G schematically illustrate the execution of a sequence of atomic-add-with-carry instructions generating a local sum value which is then accumulated into a data value when the data value is returned to a cache memory;

FIG. 6 is a diagram schematically illustrating the use of atomic-add-with-carry instructions in a system incorporating a plurality of data processing apparatuses operating as a coalescing tree to accumulate to a data value held by a root processor; and FIG. 7 is a flow diagram schematically illustrating the operation of a node within the coalescing tree of FIG. 6.

In accordance with at least some example embodiments of the disclosure there is provided an atomic-add-with-carry instruction which performs, as an atomic operation, an add of an addend operand and a data value stored in a storage unit. A carry value is generated from this atomic-add-with-carry instruction. The generation of a carry value from an atomic instruction is unusual in that it indicates that the atomic instruction is to interact with other instructions via this carry value. This is counter to the normal philosophy whereby atomic instructions are self-contained.

The storage unit could have a variety of different forms, e.g. a register. The storage unit may be memory mapped (e.g. associated with a memory address(es) within a memory address space). In some embodiments the storage unit may be a memory such as SRAM, DRAM, or similar.

Although useable and useful in a variety of different circumstances, the atomic-add-with-carry instructions may be used in some example embodiments of the disclosure in which the addend value and the data value have a shared range of bit significance and at least one of the addend operand value and the data value is part of a larger value having a total range of bit significance greater than and including the shared range of bit significance. It is thus possible to represent values greater than the data width supported and manipulated natively within a data processing apparatus by breaking up the larger data value into a plurality of data values which are separately manipulated. The bit significance of those individual data values and the larger data value may be itself programmable and represented by metadata associated with the data value concerned. In such an arrangement, the carry value generated by an atomic-add-with-carry instruction allows atomic instruction behaviour to be supported and permits the necessary interaction between the different portions of a data value of greater bit significance width to be achieved via the carry value. In such arrangements, the carry value generated by an atomic-add-with-carry instruction may be added to an addend operand of a further atomic-add-with-carry instruction representing a next most significant portion of a larger data value in a manner which permits an overall atomic behaviour to be achieved for a data manipulation which is in fact split over multiple atomic-add-with-carry instructions.

The carry value may be provided in a variety of different ways, such as an explicit return operand or via a carry out flag. In some embodiments, the atomic-add-with-carry instruction may also have a carry-in operand which is added to the addend operand before this is in turn added to the data value. Thus, the atomic instruction may in some embodiments have both a carry out value and a carry in value.

One form of example use of the atomic-add-with-carry instruction is within an apparatus that includes a cache memory to store the data value. If the data value is not present within the cache memory, then a sequence of atomic-add-with-carry instructions may accumulate a local sum value of the respective addend operand values within the apparatus with this local sum value then being added to the data value when the data value becomes available in the cache memory. Thus, the completion of execution of at least some of the atomic-add-with-carry instructions need not be delayed awaiting the data value being fetched into the cache memory.

In some example embodiments of the above type of system, the sequence of atomic-add-with-carry instructions may be from respective program threads executing upon the apparatus. Within such systems, a given atomic-add-with-carry instruction that accumulates its addend operand value to the local sum value may be returned a carry value such that the given atomic add-with-carry instruction may be completed and so permit execution to advance to execute further program instructions within the given program thread which contain the given atomic-add-with-carry instruction.

One way of ensuring that the final outcome of the sequence of atomic-add-with-carry instructions matches the intended external view of execution of that sequence is to delay returning a final carry for a final atomic-add-with-carry instruction within the sequence until the data value is available within the cache memory and the local sum value has been added to that data value in order to generate the final carry value.

Another example use of atomic-add-with-carry instructions is within a system which coalesces a plurality of such instructions to generate a local sum value, returns carry values to all but one of the input instructions, generates an output atomic-add-with-carry instruction which is then performed by a further processing apparatus from which a received carry out value is received and passed back to the instruction source for the instruction which has not yet received its carry out value. In this way, the workload of performing the adds may be distributed and early return values generated to at least some of the instruction sources, thereby permitting those instruction sources to start to perform other processing operations rather than waiting for a delayed return value depending upon processing performed elsewhere.

In some embodiments of the disclosure the received carry out value is the return value for the output atomic-add-with-carry instruction which was generated by the apparatus which coalesced the given atomic-add-with-carry instruction and the one or more further atomic-add-with-carry instructions.

The given input and further input atomic-add-with-carry instructions may form part of a sequence and within such an arrangement, the final instruction within the sequence may be held and associated with the received carry out value returned from the further processing apparatus.

The techniques of this disclosure may be usefully used when the apparatus is part of a coalescing tree to coalesce atomic-add-with-carry instructions as formed by a plurality of processing apparatus branching from a root processing apparatus with that root processing apparatus storing a data value to which the atomic adds are to be accumulated.

FIG. 1 schematically illustrates the data processing apparatus 2 including a register file 4, arithmetic/logic circuitry 6, a load store unit 8, an instruction fetch unit 10, an instruction pipeline 12 and an instruction decoder 14. In operation, program instructions are fetched by the instruction fetch unit 10 and passed to the instruction pipeline 12. When the program instructions reach the decode stage within the instruction pipeline 12, then the decoder 14 decodes these program instructions to generate control signals which control the arithmetic/logic circuitry 6, the load/store unit 8 and the register file 4 to perform processing operations as specified by the program instructions. These processing operations may include load operations and store operations performed by the load store unit 8 upon data values held within a storage unit, such as a memory. The memory may be a local cache memory, or a higher level within a hierarchical memory system.

The load store unit 8 and the arithmetic/logic unit 6 serve to provide an atomic-add-with-carry instruction which serves to add an addend operand value to a data value stored at a specified memory address in an atomic fashion (e.g. in a manner consistent with the execution of the instruction having exclusive access to that data value during execution). It will be appreciated that in the context of the present disclosure, references to add instructions also encompass subtraction instructions as a modified form of add instructions (e.g. adding a two's complement value). Accordingly, references to add instructions should also be considered to include subtraction instructions and an atomic-add-with-carry instruction corresponds to operations which are both additions and subtractions.

FIG. 2 schematically illustrates a data processing system 16 which incorporates multiple processors of the form of FIG. 1 namely processors 18, 20, 22, 24, each having a respective local cache memory 26, 28, 30, 32. The local cache memories 26, 28, 30, 32 cache data values from a shared memory 34. Coherency control circuitry 36 serves to perform coherency control operations so as to manage data coherency between the different versions of a data value which may be stored by the shared memory 34 and the respective local cache memories 26, 28, 30, 32. The processors 18, 20, 22, 24 include processing circuitry which performs data processing operations (e.g. in the context of FIG. 1 including the register file 4, the arithmetic/logic circuitry 6, and the load/store unit 8) as well as an instruction decoder 14 which serves to decode program instructions. These program instructions include atomic-add-with-carry instructions which perform, as an atomic operation, an add of an addend operand value and a data value stored in a memory (such as one of the local cache memories 26, 28, 30, 32, or the shared memory 34) to generate a result value which is stored in the memory and a carry value indicative of whether or not the add performed generated a carry out. This carry value may be returned as a return value for the atomic-add-with-carry instruction (or in some embodiments could be returned as a carry flag value). The atomic-add-with-carry instruction may also have a carry-in which is added to the addend operand value with this result then being added to the data value stored in the memory. Thus, the atomic-with-carry instruction may have both a carry in and a carry out.

FIGS. 3 and 4 are diagrams schematically illustrating the use of atomic-add-with-carry instructions from two different threads of program execution to accumulate to a value acc. This accumulate value (acc) has a total range of bit significance greater than the range of bit significance which can be accommodated by an individual operand of the atomic-add-with-carry instructions. Accordingly, the addend operand value and the data value for a given atomic-add-with-carry instruction have an associated shared range of bit significance corresponding to a portion of the larger range of bit significance associated with multiple operands. As an example, a 192-bit accumulate value may be formed from three 64-bit values $acc_1$, $acc_2$ and $acc_3$ (low-to-high bit significance order). Each of these 64-bit values corresponds to a range of bit significance within the larger total range of bit significance corresponding to the 192-bit accumulate value.

As illustrated in FIG. 3, both a first 192-bit addend and a second 192-bit addend may be accumulated into a starting 192-bit accumulate value. Each of the addends is formed of three 64-bit values. These are represented in FIG. 3 as values $av_{xy}$, where $x$ corresponds to a thread identifier and $y$ corresponds to a number indicating which range of bit significance is being represented by that addend value.

The shared range of bit significance of the individual portions of the addends and the accumulate value, together with the bit significance of the total range of bit significance may be represented by metadata associated with each of these entities. This metadata may be set so as to represent the bit significance of the values within a larger overall possible range of bit significance. The metadata effectively indicates a window into this larger overall range of bit significance which is provided by the individual and collective operands illustrated in FIG. 3. The collective larger value comprising the individual operands of FIG. 3 may itself be a small portion of the maximum range of bit significance which can be represented by appropriate use of the metadata values.

Returning to the example of FIG. 3, the addition of the first addend and the second addend into the accumulate value is an associative operation, namely it does not matter whether the first addend value is added to the accumulate value before the second addend value is added to the accumulate value or visa versa. Furthermore, the ordering of when the additions are performed may change between the different shared ranges of bit significance. Thus, for bit significance range A, the relevant portion of the first addend $av_{11}$ is added to the corresponding shared bit significance range portion of the accumulate value $acc_1$ in step $S1_1$ as the first action. A carry out from this addition is generated as signal $c_{11}$ as step $S2_1$ and added into the next higher bit significance portion of the addend, namely operand $av_{12}$. Following the addition of Step $S1_1$, the corresponding lowest bit significance portion of the second addend $av_{21}$ is added into the accumulate value (which has already been modified by addition of the relevant portion of the first addend) at step $S3_1$. A carry out value from this second addition is generated as value $c_{21}$ at step $S4_1$ and added into the operand $av_{22}$. Thus, in respect of the lowest significant portions of the first addend, the second addend and the accumulate value, the addition of the first addend portion is performed before the addition of the second addend portion. The addition of the first addend portion corresponds to ($acc_1+av_{11}$) and generates a carry out value $c_{11}$. After this addition has been performed, then the second addition adds in to the accumulating value $acc_1$ the value $av_{21}$ and generates a carry out value $c_{21}$.

In respect of the bit significance B portion of the operations, in this illustrated example, the order in which the relevant portions of the first and second addends are added into the corresponding significance portion of the accumulate value $acc_2$ is reversed compared to that bit significance portion A. Thus, $av_{22}$ is added to the accumulate value $acc_2$ at step $S1_2$. A carry out $c_{22}$ is then generated from this addition at step $S2_2$ and added into the operand $av_{23}$. Subsequently, at step $S3_2$, the operand from the first addend $av_{12}$ is added into the accumulate value for bit significance portion B at step $S3_2$. A carry out $c_{12}$ from this addition is generated at step $S4_2$ and added into the operand $av_{13}$. Thus, in respect of the bit significance portion B, the order in which the addends are accumulated into the accumulate value is reversed relative to bit significance portion A.

Finally in respect of bit significance portion C, the operand $av_{13}$ from the first addend is added to the corresponding portion of the accumulate value $acc_3$ at step $S1_3$ and generates a carry out $c_{13}$ at step $S2_3$. Then, the operand $av_{23}$ is added at step $S3_3$ to the accumulate value $acc_3$ and generates a carry out $c_{23}$ at step $S4_3$. Thus, the order in which the operands are added into the accumulate value is the same as for bit significance range A and opposite to that of bit significance range B.

Each of the additions illustrated in FIG. 3 into the accumulate value is performed as an atomic-add-with-carry operation specified by to an atomic-add-with-carry instruction. The associative nature within each bit significance range portion has the effect that the ordering of the additions within each bit significance range portion may be varied without influencing the final result. The carry out values from each addition are supplied to the next partial addend operand, which forms a portion of the total addend, and are added into that partial addend operand before its own addition is performed. This variation in the ordering which may be used in the different bit significance range portions has the effect that partway through the total calculation, the values represented by the accumulate operands $acc_1$, $acc_2$ and $acc_3$ (the in-memory representation) may not represent any true meaningful value, but at the end when all of the atomic-add-with-carry instructions have been executed, then the final result within the total accumulate value ($acc_3$: $acc_2$: $acc_1$) stored within memory will be correct and all carries will have been appropriately reflected. Since the in-memory representation may not be meaningful at all times, there are some use cases which cannot use the present techniques, yet there are a significant number of other use cases where this issue is not problematic and the present techniques may be usefully employed.

Other example embodiments may use addends and an in-memory accumulator that have different bit widths, e.g. 64-bit addends into a 192-bit accumulator. In this case often a single 64-bit AADDC will suffice when there is no carry out. Occasionally two AADDC instructions will be needed when there is one carry and rarely three AADDC instructions when there are two carries. These situations are a special case of the arrangement of FIG. 3 where an "early-out" is supported when no carry is generated.

FIG. 4 schematically illustrates the execution of atomic-add-with-carry instructions (AADDC) for each of the two threads corresponding respectively to the first addend values and the second addend values of FIG. 3. The execution of these program instructions is shown relative to a time line. In the example of FIG. 4, the least significance atomic-add-with-carry instruction for the first thread, namely $AADDDC_{11}$, is executed first. This is then followed by the atomic-add-with-carry instructions for the least significance bit portion and the middle significance bit portion, namely $AADDC_{21}$ and $AADDC_{22}$, for the second thread. Following this, the atomic-add-with-carry instructions for the middle significance portion and the most significance portion of the first thread, namely $AADDC_{12}$ and $AADDC_{13}$, are performed. Finally, the atomic-add-with-carry instruction for the most significant portion of the second thread, namely $AADDC_{23}$, is performed. Within each thread, the atomic-add-with-carry instructions are performed in their bit significance order with a carry signal propagating therebetween as required. Between the threads, the ordering is associative and may be varied to suit the requirements of the system. The associative behavior between thread allows greater freedom in instruction scheduling.

FIGS. 5A to 5G schematically illustrate the use of atomic-add-with-carry instructions in the context of a system having a cache memory 38 serving to store cache lines of data from the shared memory 34. An input queue 40 contains a queue of atomic-add-with-carry instructions (AADDC) from respective program threads A, B, C and D. Processing circuitry 42 serves to execute these AADDC instructions when the data value being added in to is not present within the cache 38 by accumulating into a local sum value 44 using a local accumulator 46. Instructions awaiting their return operands are parked within a parking operations queue 48. When an instruction has executed and has all its return operands, then it is sent to an output queue 50.

FIG. 5A illustrates the situation in which the addend value 0x01 for Thread A is added, the initial local sum value 44 of 0x00 ("0x" indicates a hexadecimal number). The data value from the shared memory 34 is not present within the cache 36.

Figure 1:
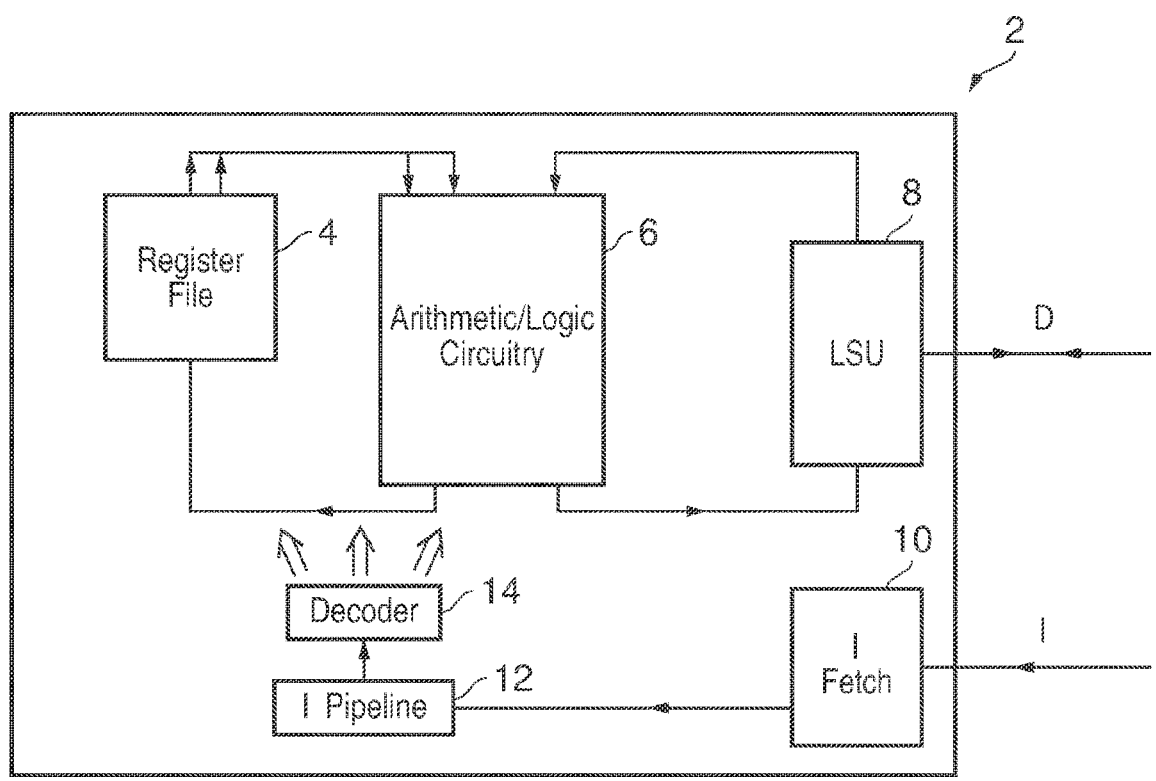
Figure 2:
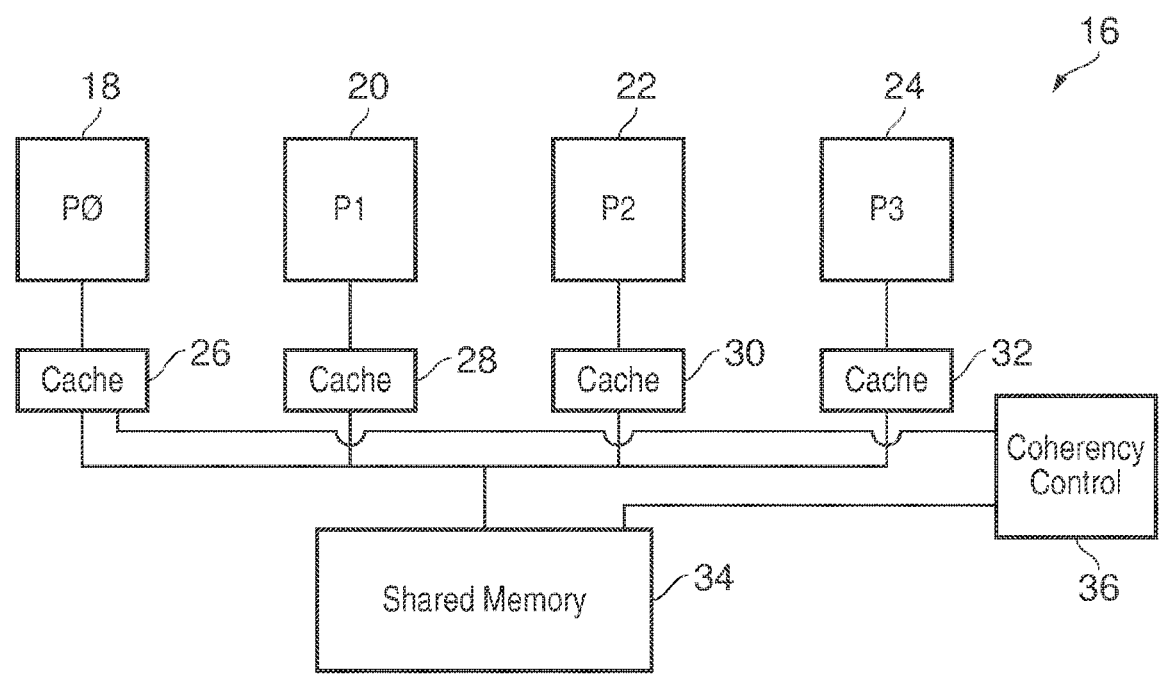
Figure 3:
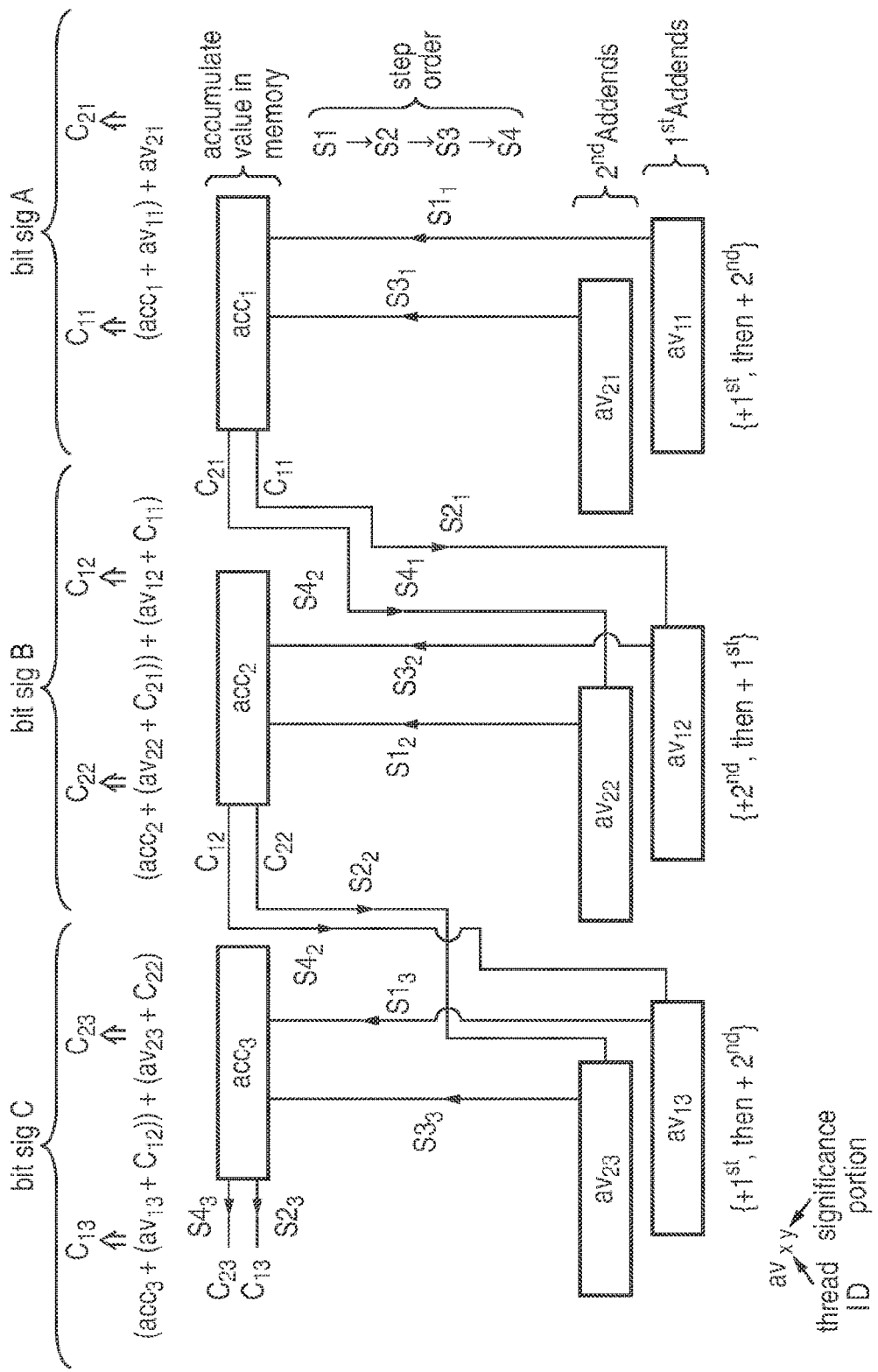
Figure 4:
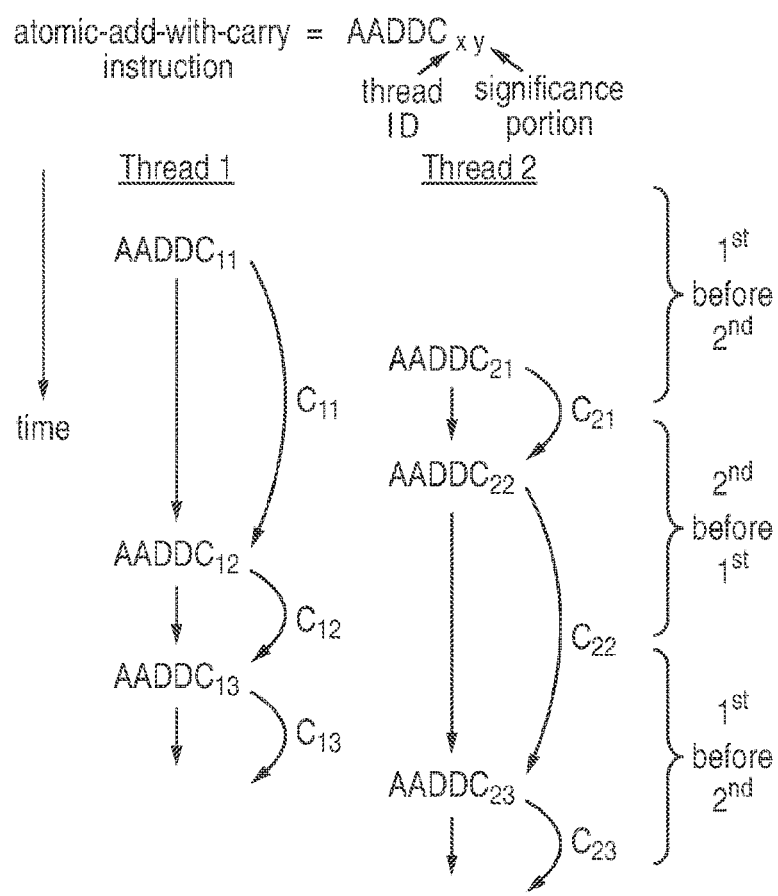
Figure 5A:
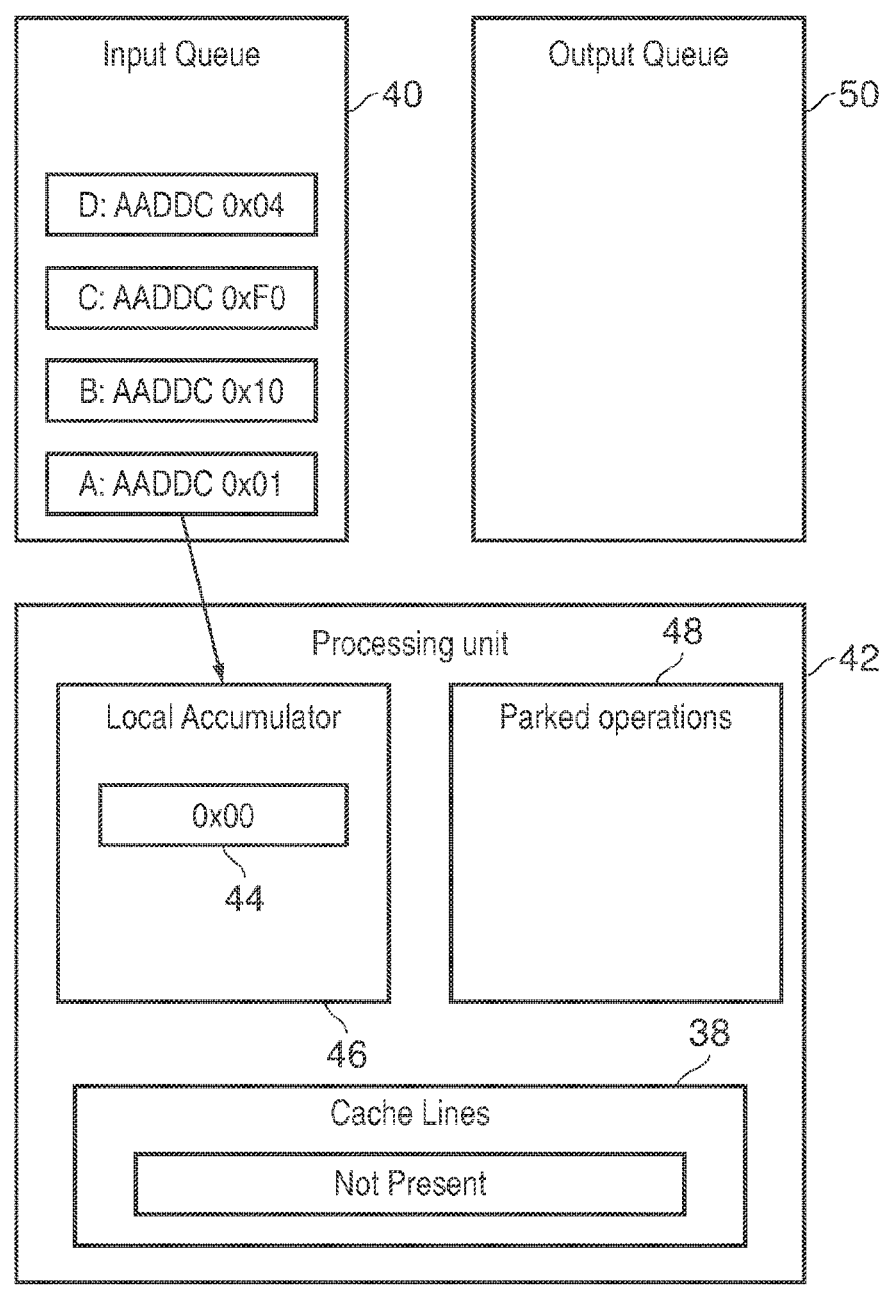
FIG. 5B illustrates execution of the second atomic-add-with-carry instruction AADDC—0x10 from Thread B, which has an addend operand value 0x10 and which is accumulated into the local sum 44. The AADDC instruction for Thread A is parked within the parked operations queue 48.
FIG. 5C illustrates the next cycle at which the return carry value for Thread A is returned indicating no carry occurred. At the same time, the addend operand value 0xF0 for the Thread C is added to the local sum value 44 0x11 to generate an updated local sum value.
Figure 5B:
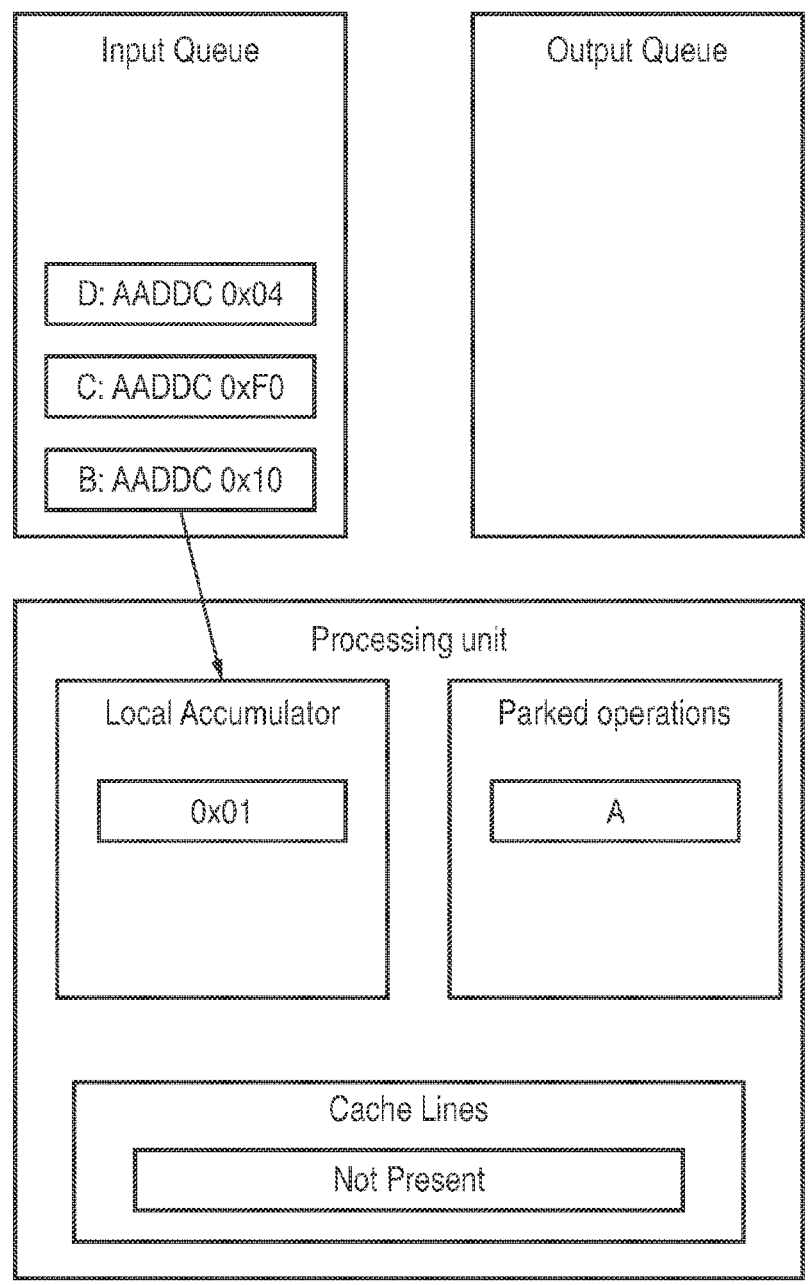
Figure 5C:
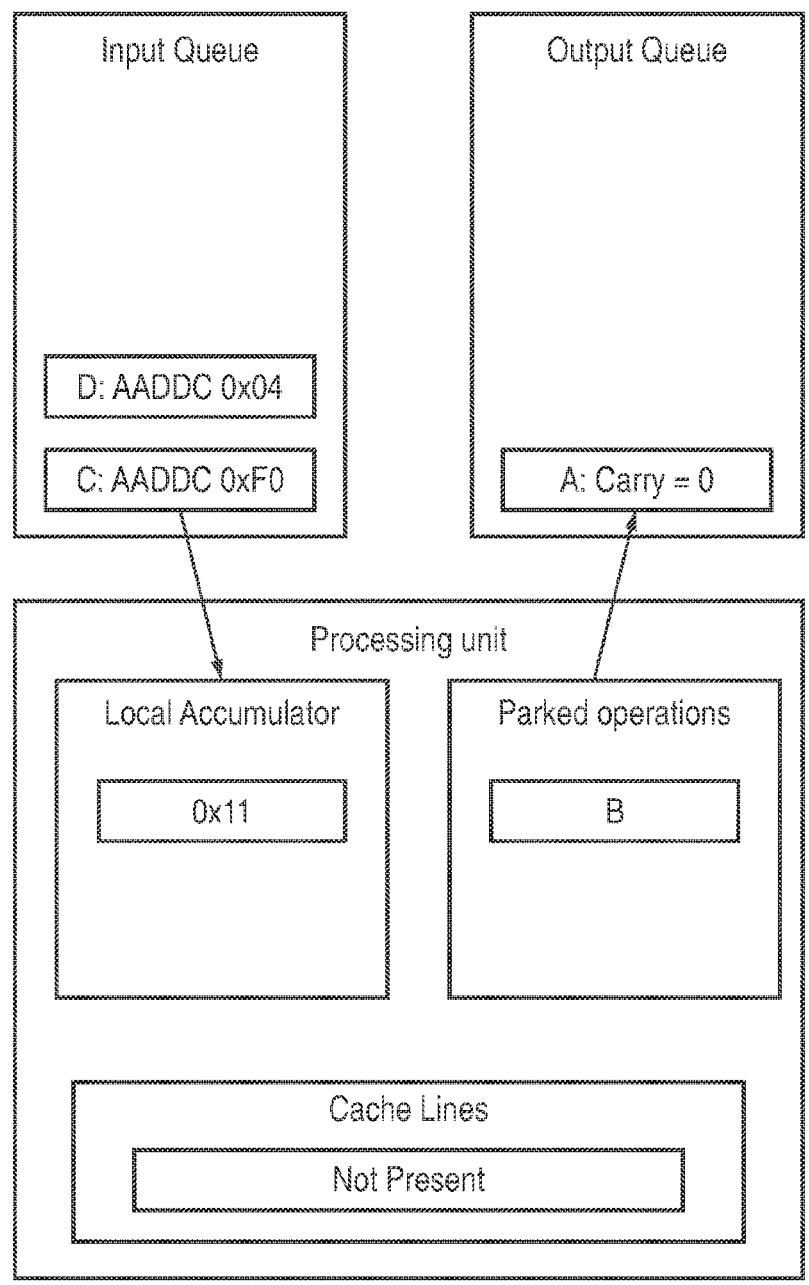
Figure 5D:
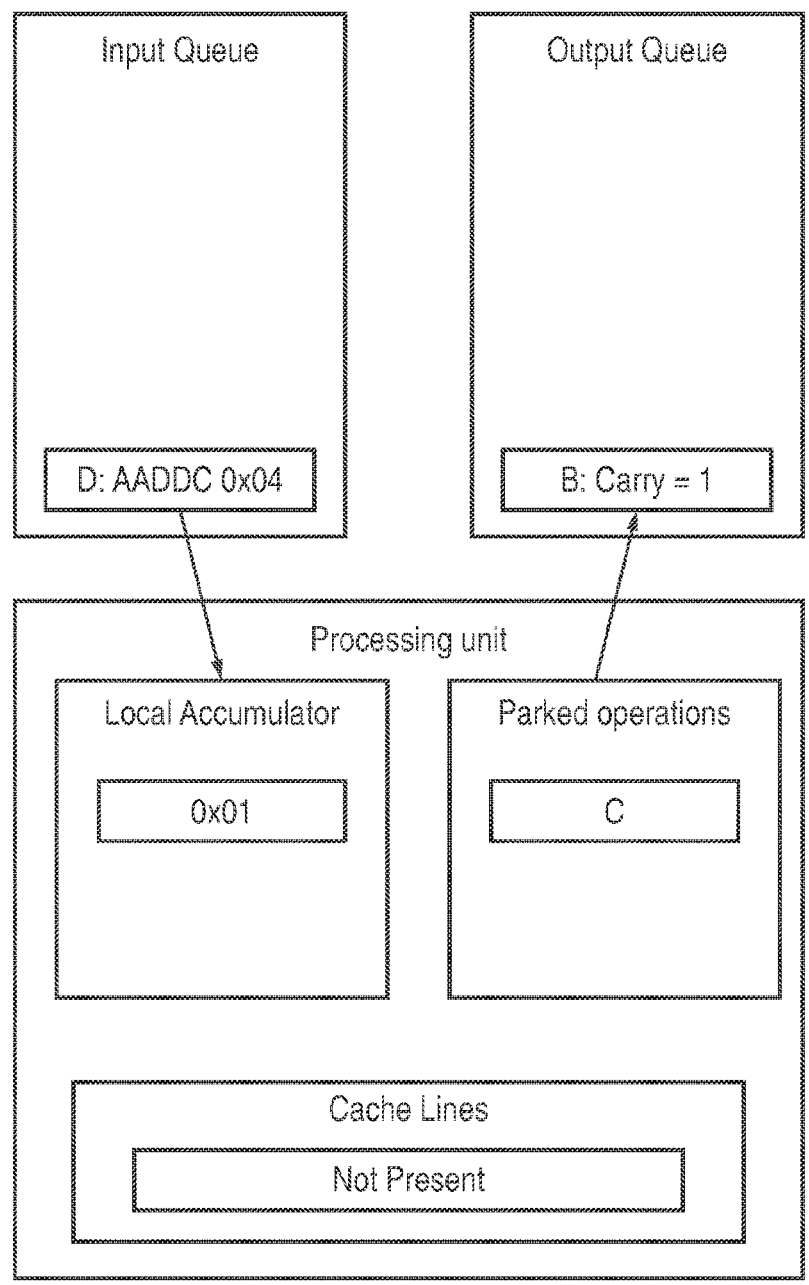

FIG. 5D illustrates the Thread D addend operand value 0x04 being added into the local sum value 0x01 to generate an updated local sum value 0x04. The previous add of FIG. 5C generated a carry and this carry is sent as the returned carry output value associated with Thread B as illustrated. Thus, Thread B is associated with a carry out value which in fact resulted from the addition performed in respect of Thread C.

Figure 5E:
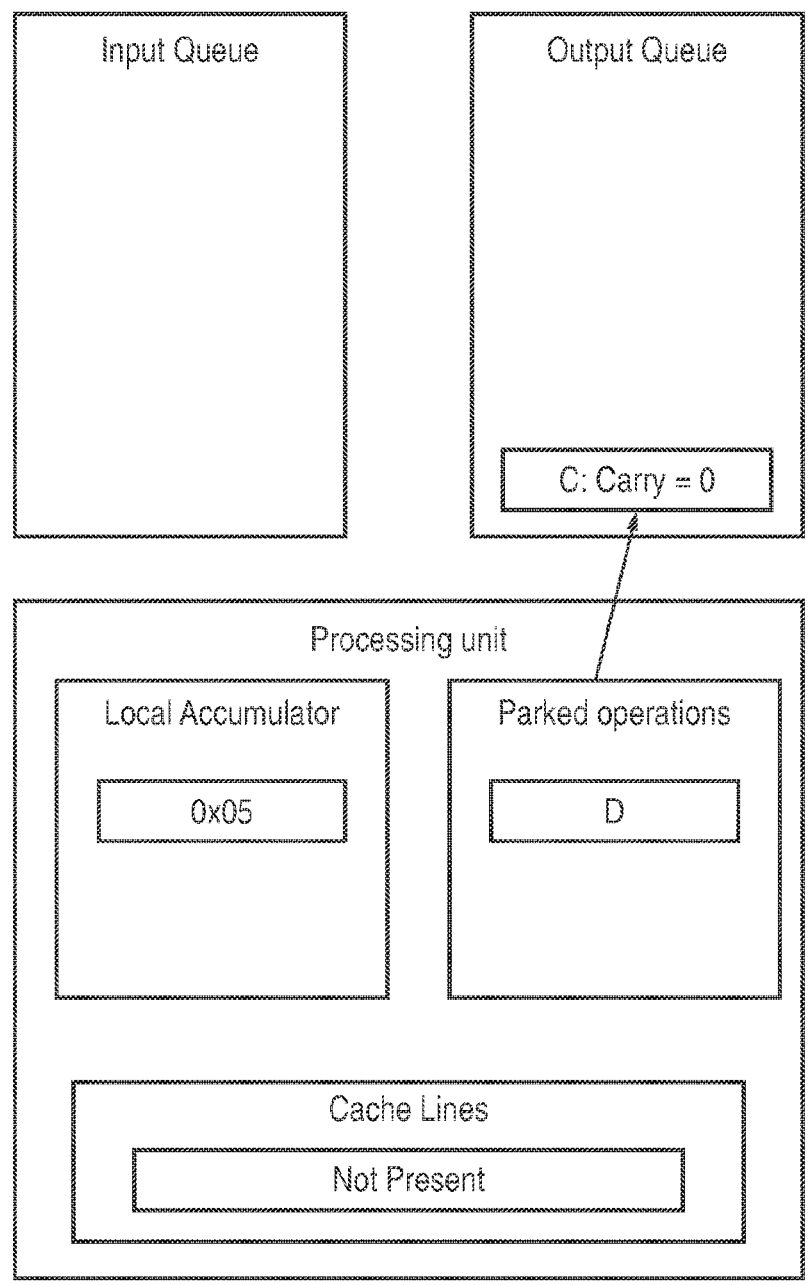

FIG. 5E illustrates the situation after the final atomic-add-with-carry instruction for Thread D has been executed and added to the local sum value 44 producing result 0x05. At the same time, a return carry out value which is to be associated with Thread C, and corresponds to the addition of the addend operand value for Thread D, is passed out and is a zero. This leaves as a parked operation Thread D.

Figure 5F:
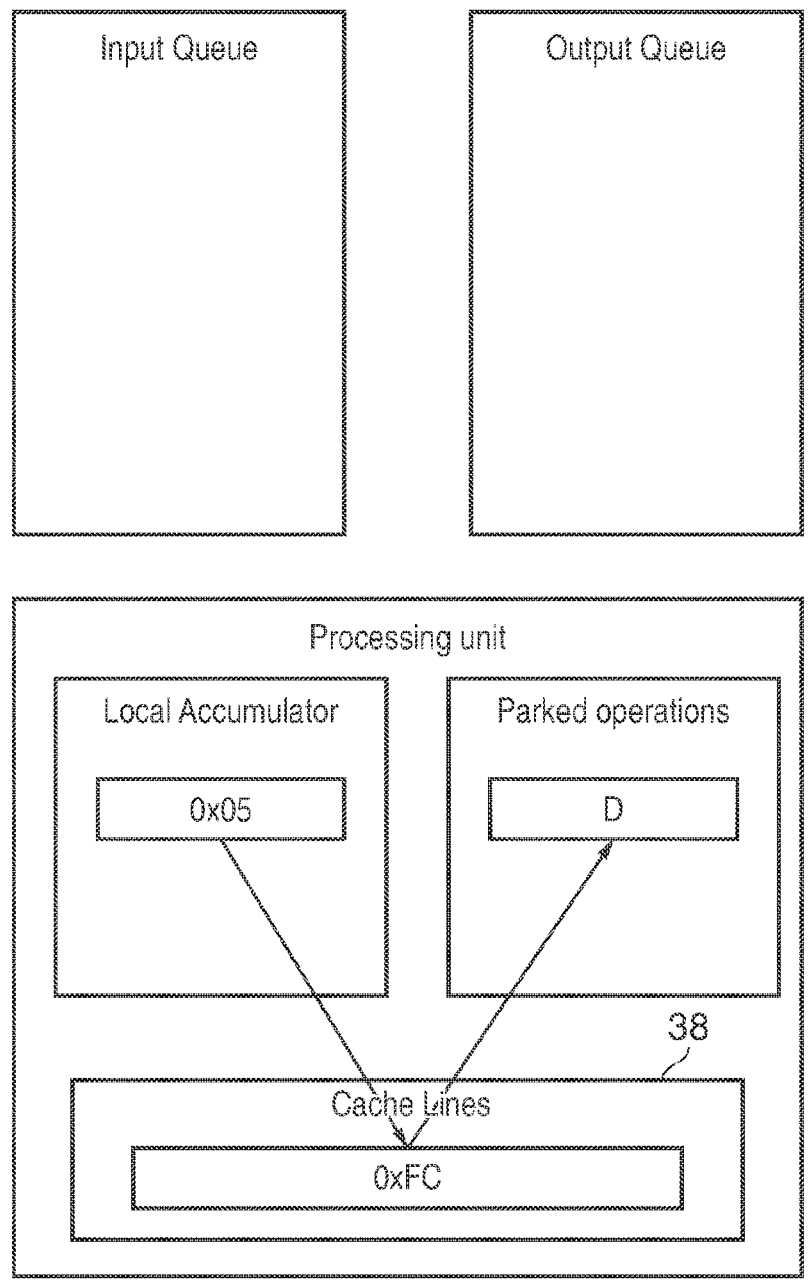
Figure 5G:
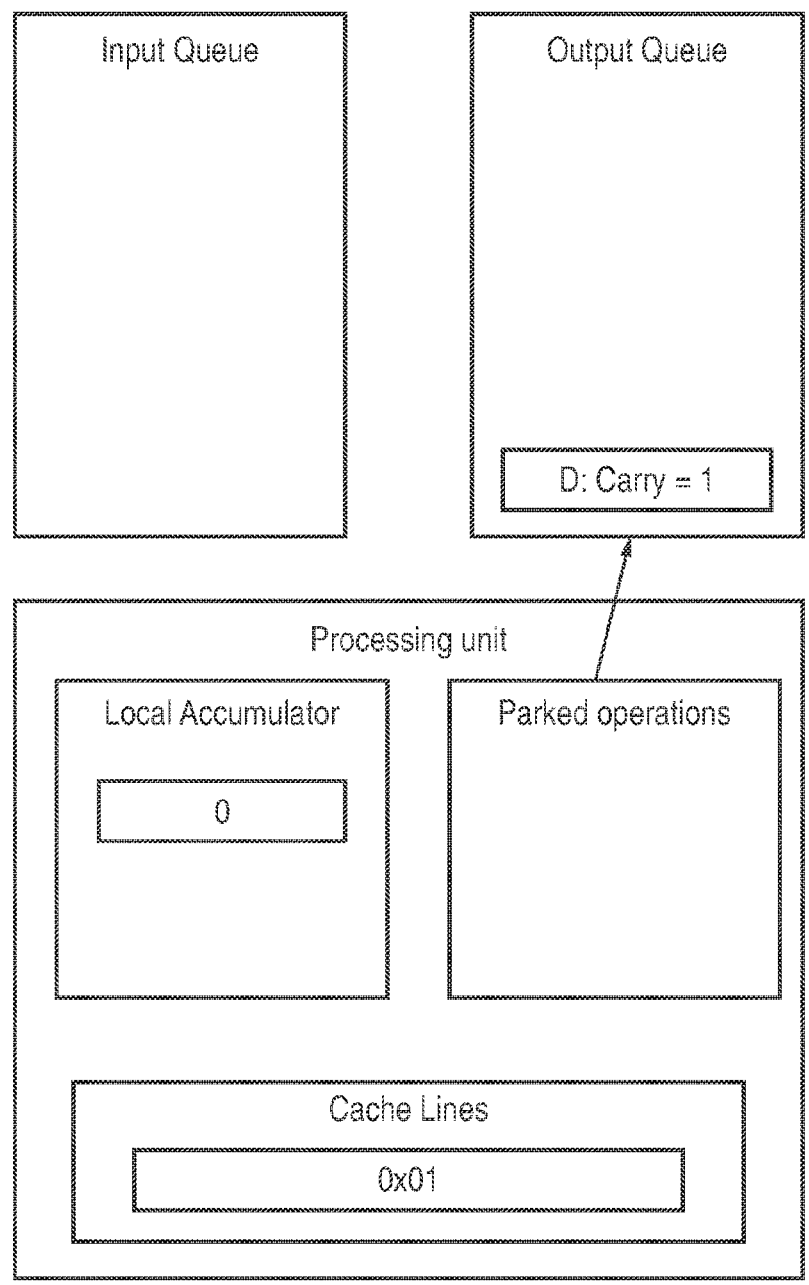

It will be appreciated that each of the atomic-add-with-carry instructions for Threads A, B, C and D have been performed with respect to a local sum value, but not yet with respect to the data value stored in the shared memory 34 as intended. FIG. 5F illustrates how the data value 0xFC is returned from the shared memory 34 to the cache memory 38 and then the local sum value 0x05 is added to this so as to generate the return carry out value for the final parked operation from Thread D. In the example of FIG. 5G, the final result stored into the data value (currently held within the cache 38) results in the data value 0x01 with a final carry out value of 1.

Thread D is the final thread in the sequence of threads and return of its return carry out value is delayed until the final addition with the data value has been performed. The other Threads A, B, C have return carry out values supplied to them in advance of the final addition with the data value being performed and accordingly these threads may be released to perform further processing operations earlier than if they had waited for the data value to be returned to the cache 38. Thus the addend operands are accumulated within a local sum value 44 and return carry out values returned for all but the final instruction. When the data value becomes available, then the local sum value is added to it, and the final return carry out value can be generated and returned for the final instruction of Thread D.

Figure 6:
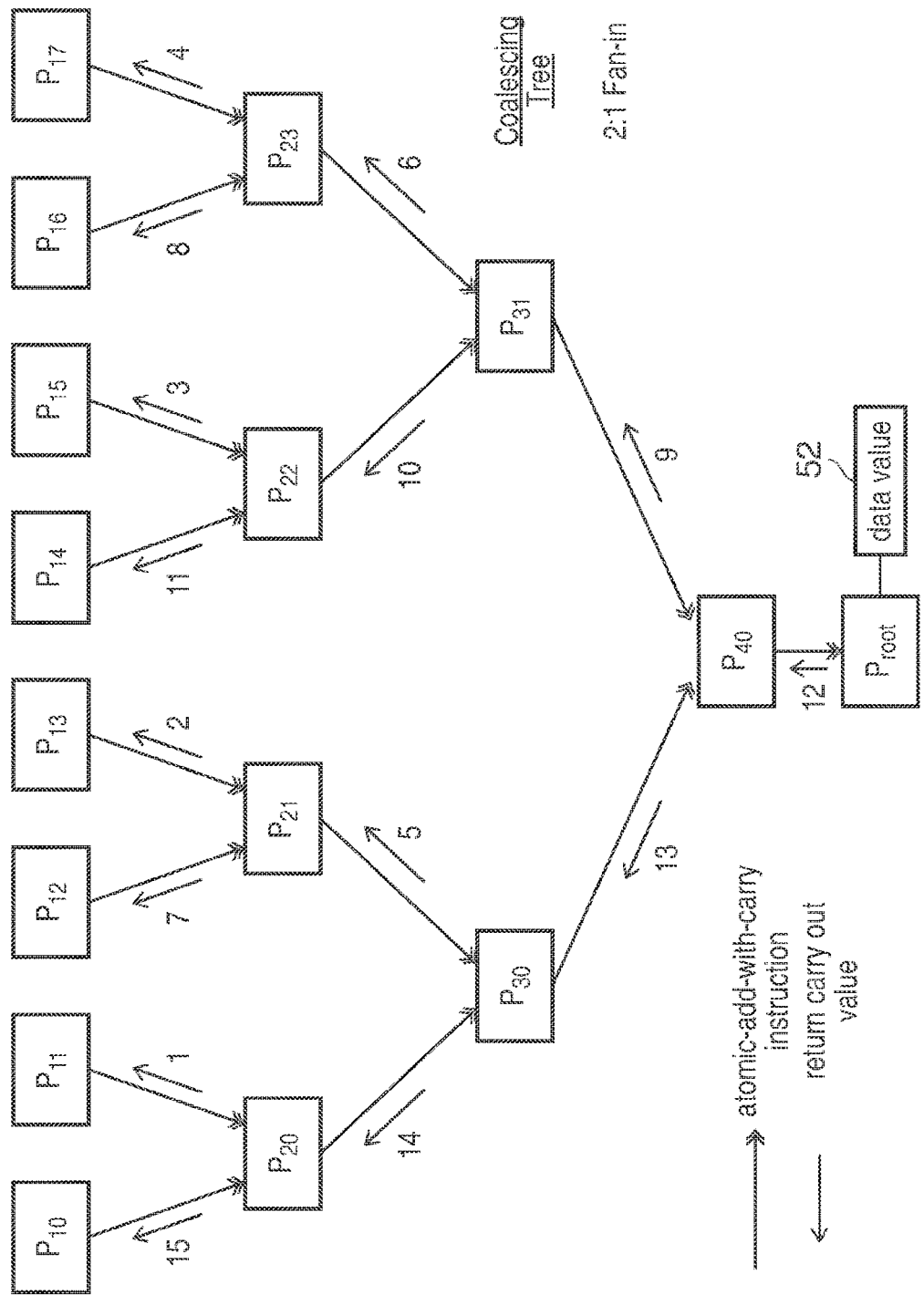

FIG. 6 schematically illustrates use of the atomic-add-with-carry instructions in another context. This context is a coalescing tree with a 2:1 fan-in for performing the atomic-add-with-carry instructions. Each of the coalescing nodes within the coalescing tree of FIG. 6 represents a processing apparatus which receives a plurality of atomic-add-with-carry instructions from a processing apparatus at a higher level in the hierarchy (as illustrated in FIG. 6). At the highest level in the hierarchy are processing apparatuses $P_{10}$ to $P_{17}$ which each output an atomic-add-with-carry instruction. The next level is coalescing processors $P_{20}$ to $P_{23}$. The next level is coalescing processors $P_{30}$ and $P_{31}$. Finally, among the coalescing processors, is processor $P_{40}$. The processing apparatus which holds the data value 52 to which the accumulate (add) are to be made is processor $P_{root}$. The coalescing processors at the nodes between the highest level in the hierarchy are FIG. 6 and the root of the hierarchy of FIG. 6 each receive two atomic-add-with-carry instructions and generate one output atomic-add-with-carry instruction which is passed down to the next lower level within the hierarchy, i.e. a 2:1 fan-in. A return carry out operand value is returned from each coalescing node to the first instruction source from which it received an atomic-add-with-carry instruction when the node has formed a local sum value from the addend operands of its received atomic-add-with-carry instructions. The second of the atomic-add-with-carry instructions is not supplied with its return carry out value and is held until a return carry out value is received by that node in respect of the output atomic-add-with-carry instruction which it generated. The fan-in illustrated in FIG. 6 is 2:1, but it will be appreciated that higher levels of fan-in could be supported if desired.

Each coalescing node within the coalescing tree of FIG. 6 receives both a given input atomic-add-with-carry instruction (the one for which the return will be delayed) and one or more further input atomic-add-with-carry instructions. The node performs a local addition of the given addend operand value for the given input atomic-add-with-carry instruction and the one or more further input addend operand values for the one or more further input atomic-add-with-carry instructions to generate a local sum value and one or more local carry out values. These one or more local carry out values are sent as respective return values to the one or more further instruction sources of the one or more further instructions. The node generates an output atomic-add-with-carry instruction specifying the local sum value as its addend operand value and passes this to the next lower level within the coalescing tree of FIG. 6. The node then waits until it receives a received carry out value in respect of this output atomic-add-with-carry instruction and when this is received, it is sent as a return value to the given instruction source which is the instruction source which was waiting for its return carry out value.

At the root level within the coalescing tree the node $P_{root}$ receives a single atomic-add-with-carry instruction which it performs atomically upon the stored data value 52 and generates a return value. The addend operand value for the atomic-add-with-carry instruction received by the root node $P_{root}$ is a sum of all the addend operands for the nodes $P_{10}$ to $P_{17}$ in the hierarchy. Carry out values in respect of carries generated during formation of this local sum value have already been returned.

As illustrated in FIG. 6, the nodes $P_{20}$ to $P_{23}$ each perform their local sum and coalescing operation and generate respective return carry out values for one of their two instruction sources. These return carry out values that are numbered 1, 2, 3, 4 in FIG. 6. The remaining return carry out values for these nodes are not generated at this time, and the relevant threads in the higher level of the tree are held awaiting return of those return values.

At the next lower level in the hierarchy, the nodes $P_{30}$ and $P_{31}$ each receive two atomic-add-with-carry instructions from the level above and again perform a local sum operation generating one return carry out value illustrated as return carry out values 5, 6, with the other carry out values being held.

The return value 5 is sent to node $P_{21}$ and can then serve to generate the return value 7 which is sent from node $P_{21}$ to node $P_{12}$. The return value 6 received at node $P_{23}$ is used to serve as the return value 8 which is sent from node $P_{23}$ to node $P_{16}$.

The final coalescing level within the coalescing tree of FIG. 6 corresponds to node $P_{40}$. This receives atomic-add-with-carry instructions from nodes $P_{30}$ and $P_{31}$. Node $P_{40}$ performs a local add of the addend operands of each of the received atomic-add-with-carry instructions and generates a return carry out value 9 which is passed back to node $P_{31}$. The return carry out value 9 can then propagate via node $P_{31}$ and node $P_{22}$ to serve as return carry out value 11 sent to node $P_{14}$.

The final coalescing node $P_{40}$ generates an output atomic-add-with-carry instruction which is sent to the route node $P_{root}$ where it is added to the data value 52 and generates a return carry out value 12 which is returned to node $P_{40}$. The return value 12 propagates via nodes $P_{30}$ and $P_{20}$ to reach node $P_{10}$ as carry 15.

In overall operation it will be seen that each of the original source nodes $P_{10}$ to $P_{17}$ eventually receives a return carry out value. Early return carry out values are received by a significant proportion of these instruction sources (nodes) allowing them to continue with other processing before the final addition is performed at the root node $P_{root}$.

Figure 7:
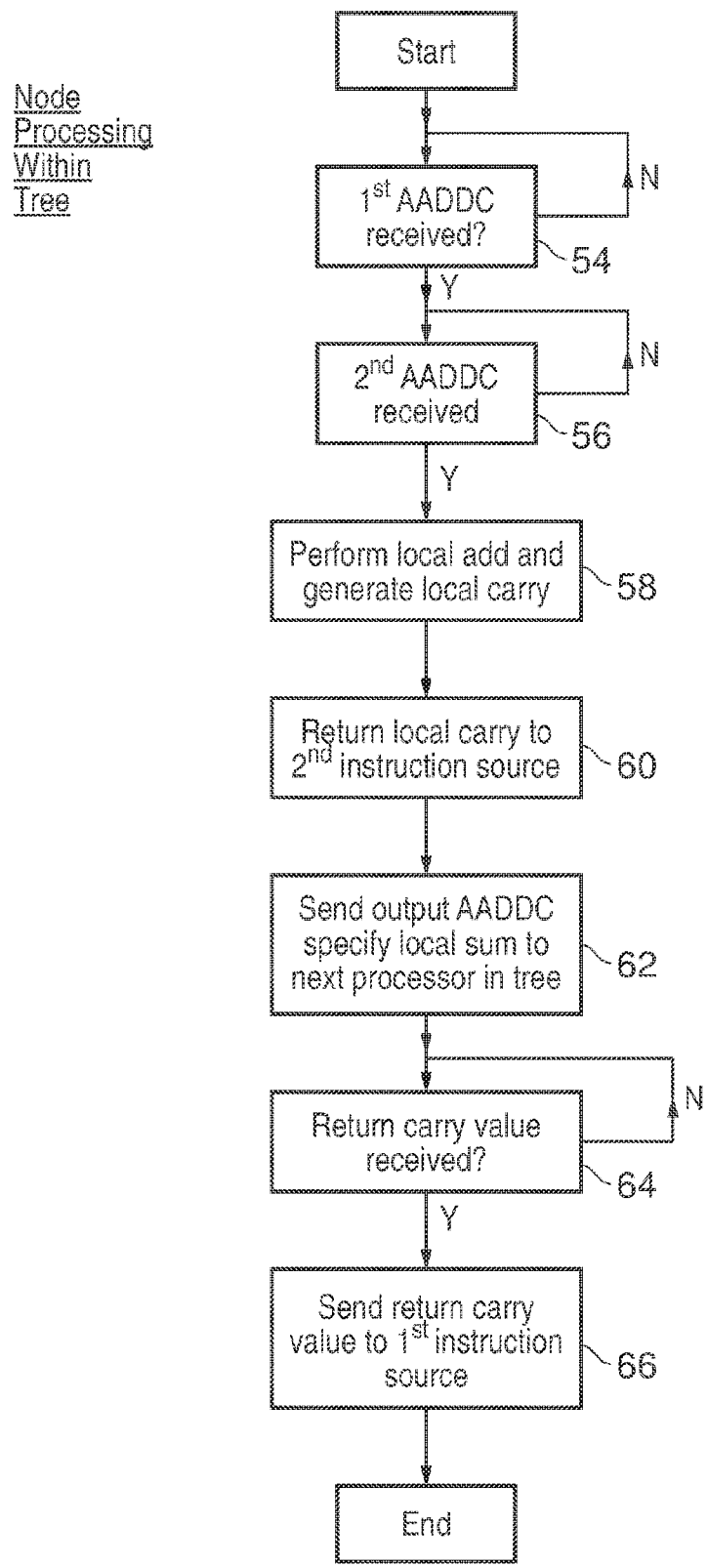

FIG. 7 is a flow diagram schematically illustrating the operation of one of the coalescing nodes of FIG. 6 (i.e. with a 2:1 fan-in). At step 54 processing waits until a first atomic-add-with-carry instruction is received. Processing then waits at step 56 until a second atomic-add-with-carry instruction is received. Step 58 performs a local add and generates a local carry. Step 60 returns the local carry to the second instruction source. Step 62 then sends an output atomic-add-with-carry instruction specifying the local sum calculated at step 58 to the next processor lower within the coalescing tree hierarchy. Step 64 waits until a return carry out value is received at the node. When a return carry out value is received, then step 66 forwards this return carry out value to the first instruction source.

Although illustrative embodiments have been described in detail herein with reference to the accompanying drawings, it is to be understood that the claims are not limited to those precise embodiments, and that various changes, additions and modifications can be effected therein by one skilled in the art without departing from the scope and spirit of the appended claims. For example, various combinations of the features of the dependent claims could be made with the features of the independent claims.

The invention claimed is:

1. Apparatus for processing data comprising:
   processing circuitry to perform processing operations specified by program instructions;
   an instruction decoder to decode an atomic-add-with-carry instruction to control said processing circuitry to perform as an atomic operation an add of an addend operand value and a data value stored in a storage unit in a manner consistent with exclusive access to said data value during said atomic operation to generate a result value stored in said storage unit and a carry value indicative of whether said add generated a carry out; and
   a cache memory to store said data value, wherein, at least when said data value is not present in said cache memory, said processing circuitry is responsive to a sequence of instances of the atomic-add-with-carry instruction to accumulate a local sum value of respective addend operand values of a plurality of the instances of the atomic-add-with-carry instruction within said sequence and to add said local sum value to said data value when said data value is available in said cache memory.

2. Apparatus as claimed in claim 1, wherein said storage unit is a memory mapped storage unit.

3. Apparatus as claimed in claim 1, wherein said storage unit is a memory.

4. Apparatus as claimed in claim 1, wherein each of the respective addend operand values and said data value have a shared range of bit significance and at least one of the respective addend operand values and said data value is part of a larger value having a total range of bit significance greater than and including said shared range of bit significance.

5. Apparatus as claimed in claim 4, wherein said instruction decoder decodes a further atomic-add-with-carry instruction to perform a further add with a further shared range of bit significance, said shared range of bit significance and said further shared range of bit significance being discrete ranges within said total range of bit significance.

6. Apparatus as claimed in claim 5, wherein said further shared range of bit significance is contiguous with said shared range of bit significance and corresponds to higher order bits within said total range of bit significance than said shared range of bit significance.

7. Apparatus as claimed in claim 6, wherein said carry value generated by each atomic-add-with-carry instruction in the sequence is added to an addend operand of a corresponding further atomic-add-with-carry instruction.

8. Apparatus as claimed in claim 1, wherein said processing circuitry is formed to return said carry value as a return value when each atomic-add-with-carry instruction in the sequence is performed.

9. Apparatus as claimed in claim 1, wherein each atomic-add-with-carry instruction in the sequence has a carry-in operand and said add is an add of said addend operand, said data value and said carry-in operand.

10. Apparatus as claimed in claim 1, wherein said sequence of instances of the atomic-add-with-carry instruction comprises instructions from respective program threads executing upon said apparatus.

11. Apparatus as claimed in claim 10, wherein said processing circuitry is formed, upon executing a given atomic-add-with-carry instruction that accumulates a given addend operand value for a given program thread into said local sum value and generates a given carry value, to return said given carry value to said given program thread to permit said given program thread to advance to execute further program instructions within said given program thread following said given atomic-add-with-carry instruction.

12. Apparatus as claimed in claim 11, wherein said processing circuitry is formed to delay returning a final carry value for a final atomic-add-with-carry instruction within said sequence until said data value is available in said cache memory and said local sum value is added to said data value to generate said final carry value.

13. Apparatus as claimed in claim 1, wherein said processing circuitry is formed to respond to a given input atomic add-with-carry instruction specifying a given addend operand value received from a given instruction source and one or more further input atomic-add-with-carry instructions specifying respective further addend operand values received from respective further instruction sources to:
  perform a local addition of said given addend operand value and said one or more further input addend operand values to generate a local sum value and one or more local carry out values;
  send said one or more local carry out values as respective return values to said one or more further instruction sources;
  generate an output atomic-add-with-carry instruction specifying said local sum value as an output addend operand value;
  send said output atomic-add-with-carry instruction to a further processing apparatus;
  receive a received carry out value; and
  send said received carry out value as a return value to said given instruction source.

14. Apparatus as claimed in claim 13, wherein said received carry out value is a return value for said output atomic-add-with-carry instruction.

15. Apparatus as claimed in claim 13, wherein said given input atomic-add-with-carry instructions and said one or more further input atomic-add-with-carry instructions are an input sequence of input atomic-add-with-carry instructions and said given input atomic-add-with-carry instruction is a final input atomic-add-with-carry instruction within said input sequence.

16. Apparatus as claimed in claim 13, wherein said apparatus is part of a coalescing tree to coalesce atomic-add-with-carry instructions and formed of a plurality of processing apparatus branching from a root processing apparatus storing said data value.

17. Apparatus for processing data comprising:
  processing means for performing processing operations specified by program instructions;
  instruction decoding means for decoding an atomic-add-with-carry instruction to control said processing means to perform as an atomic operation an add of an addend operand value and a data value stored in a storage unit in a manner consistent with exclusive access to said data value during said atomic operation to generate a result value stored in said storage unit and a carry value indicative of whether said add generated a carry out; and
  cache memory means for storing said data value, wherein, at least when said data value is not present in said cache memory means, said processing means is responsive to a sequence of instances of the atomic-add-with-carry instruction to accumulate a local sum value of respective addend operand values of a plurality of the instances of the atomic-add-with-carry instruction within said sequence and to add said local sum value to said data value when said data value is available in said cache memory means.

18. A method of processing data comprising:
  performing processing operations specified by program instructions with processing circuitry;
  decoding an atomic-add-with-carry instruction to control said processing circuitry to perform as an atomic operation an add of an addend operand value and a data value stored in a storage unit in a manner consistent with exclusive access to said data value during said atomic operation to generate a result value stored in said storage unit and a carry value indicative of whether said add generated a carry out; and
  responsive to a sequence of instances of the atomic-add-with-carry instruction, at least when said data value is not present in a cache memory, accumulating a local sum value of respective addend operand values of a plurality of the instances of the atomic-add-with-carry instruction within said sequence and adding said local sum value to said data value when said data value is available in said cache memory.

* * * * *